United States Patent
Jung et al.

(10) Patent No.: US 9,983,453 B2
(45) Date of Patent: May 29, 2018

(54) LIQUID CRYSTAL DISPLAY INCLUDING TRANSISTOR WITH IMPROVED CHARGING RATE

(71) Applicant: Samsung Display Co. Ltd., Yongin (KR)

(72) Inventors: Keum Dong Jung, Seoul (KR); Seung Hwan Moon, Asan-si (KR); Seong Young Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 33 days.

(21) Appl. No.: 14/994,988

(22) Filed: Jan. 13, 2016

(65) Prior Publication Data

US 2017/0003560 A1   Jan. 5, 2017

(30) Foreign Application Priority Data

Jul. 3, 2015   (KR) .......................... 10-2015-0095315

(51) Int. Cl.
*G09G 3/36* (2006.01)
*G02F 1/1362* (2006.01)
(Continued)

(52) U.S. Cl.
CPC .... *G02F 1/136286* (2013.01); *G02F 1/13306* (2013.01); *G02F 1/136213* (2013.01);
(Continued)

(58) Field of Classification Search
CPC ......... G02F 1/136286; G02F 1/136213; G02F 1/13306; G02F 2001/134345
See application file for complete search history.

(56) References Cited

U.S. PATENT DOCUMENTS

2010/0157185 A1\* 6/2010 Kim ...................... G02F 1/1362
349/38
2011/0267554 A1\* 11/2011 Yang ................... G02F 1/13624
349/41

(Continued)

FOREIGN PATENT DOCUMENTS

KR   1020100055154   5/2010
KR   1020120013552   2/2012
(Continued)

*Primary Examiner* — Kwang-Su Yang
(74) *Attorney, Agent, or Firm* — Cantor Colburn LLP

(57) ABSTRACT

A liquid crystal display includes a display panel including first and second subpixels, where the first subpixel includes a first switching device including a first electrode connected to the j-th data line, a second electrode connected to a first subpixel electrode and a gate electrode connected to an i-th gate line, the second subpixel includes a second switching device including a first electrode connected to a j-th data line, a second electrode connected to a second subpixel electrode and a gate electrode connected to the i-th gate line, a third switching device including a first electrode connected to the second subpixel electrode and a gate electrode connected to the i-th gate line, and a fourth switching device including a first electrode connected to the j-th data line, a second electrode connected to the first electrode of the third switching device and a gate electrode connected to the i-th gate line.

5 Claims, 12 Drawing Sheets

(51) Int. Cl.
*G02F 1/133* (2006.01)
*G02F 1/1343* (2006.01)

(52) U.S. Cl.
CPC .................. *G09G 3/3648* (2013.01); *G02F 2001/134345* (2013.01); *G09G 2300/0443* (2013.01); *G09G 2300/0814* (2013.01); *G09G 2320/028* (2013.01)

(56) References Cited

U.S. PATENT DOCUMENTS

2013/0128166 A1* 5/2013 Chiang ................ G02F 1/1362
349/38
2016/0043231 A1* 2/2016 Koezuka ............. H01L 29/7869
257/43

FOREIGN PATENT DOCUMENTS

| KR | 1020120090369 | | 8/2012 | | |
|----|---------------|---|--------|---|---|
| KR | 1020120126223 | | 11/2012 | | |
| KR | 1020140043526 | | 4/2014 | | |
| KR | 1020140043526 | A * | 4/2014 | ......... | H01L 29/7869 |
| KR | 1020140049375 | | 4/2014 | | |
| KR | 1020140061611 | | 5/2014 | | |

* cited by examiner

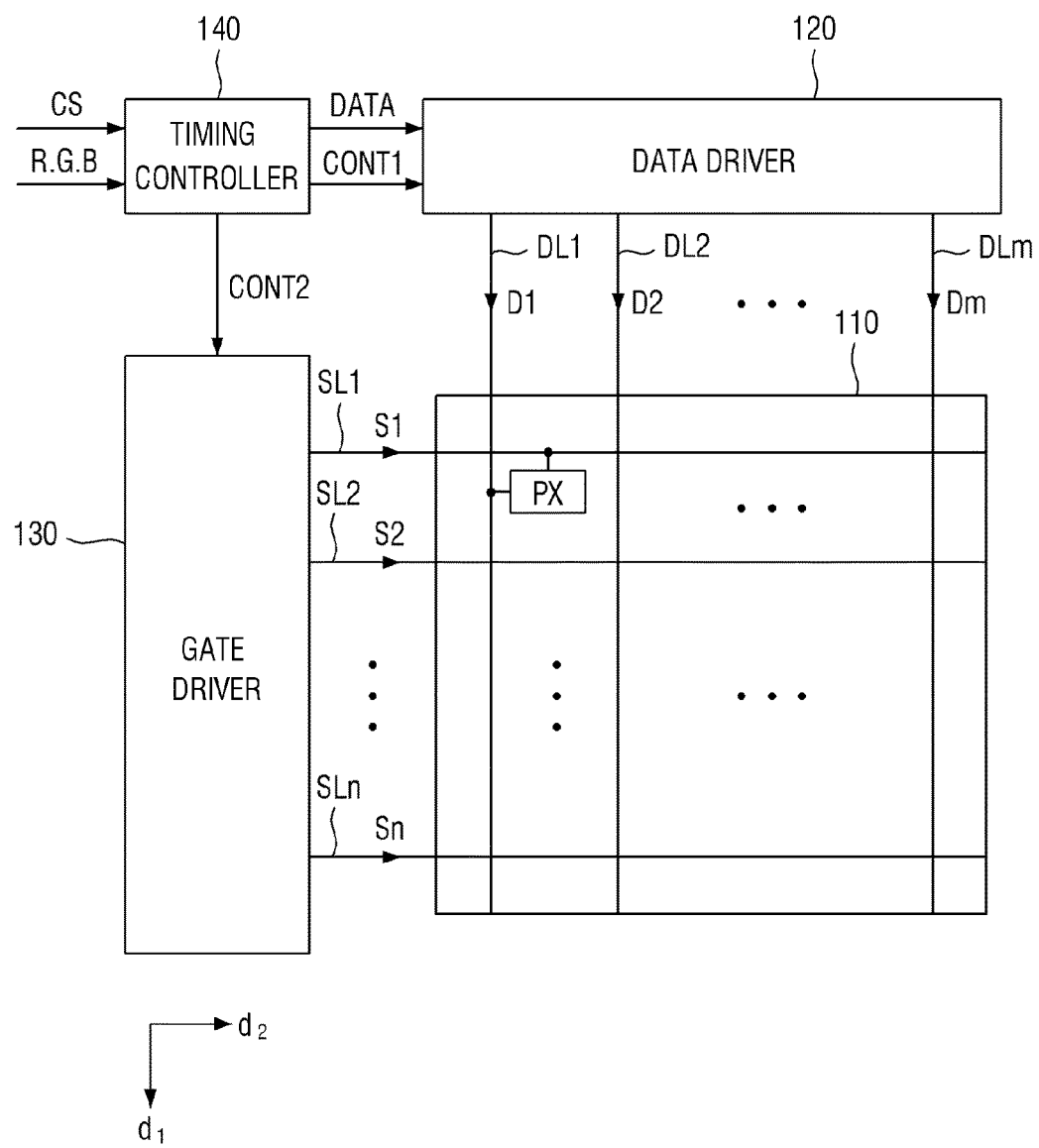
[FIG. 1]

[FIG. 2]
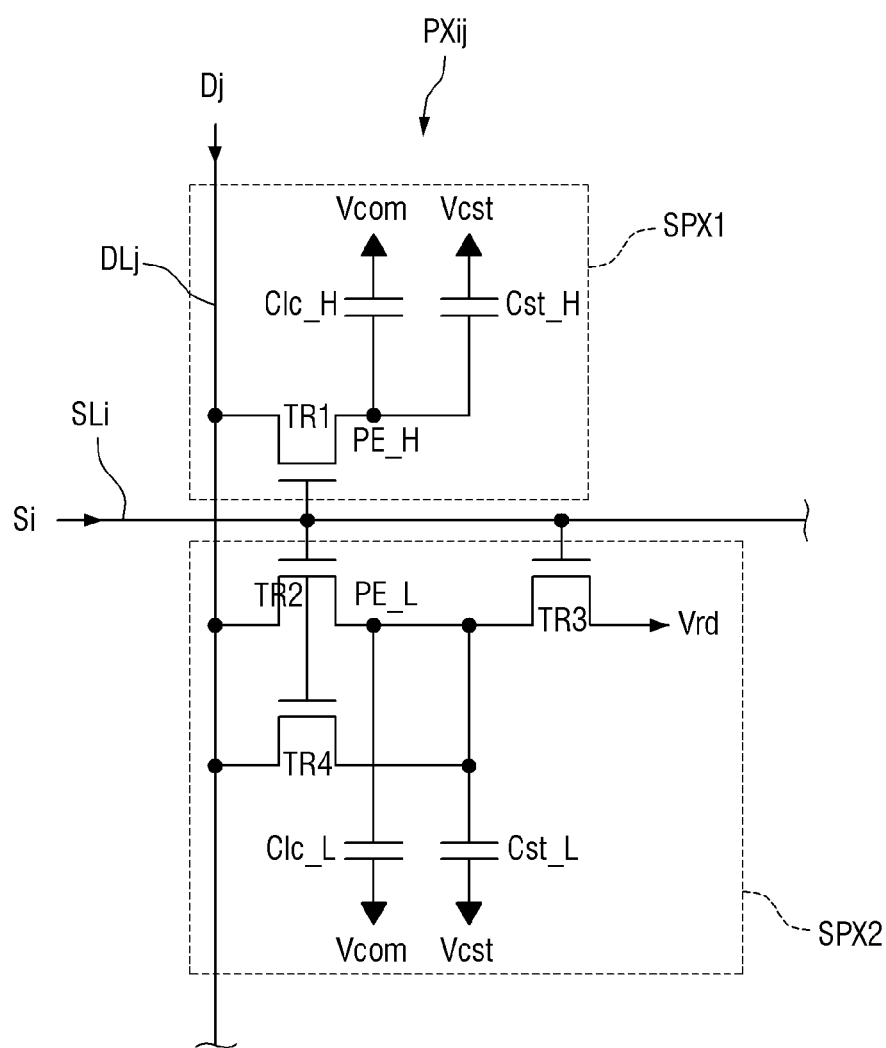

[FIG. 3]
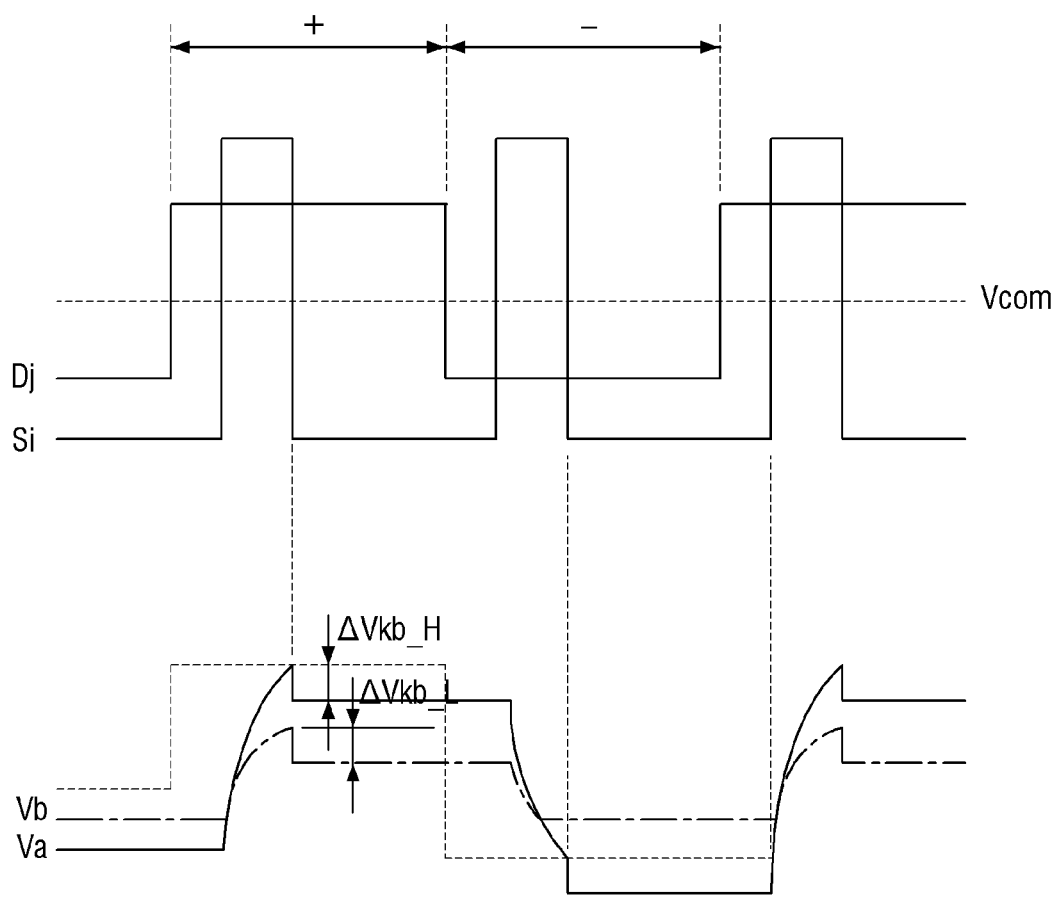

[FIG. 4]
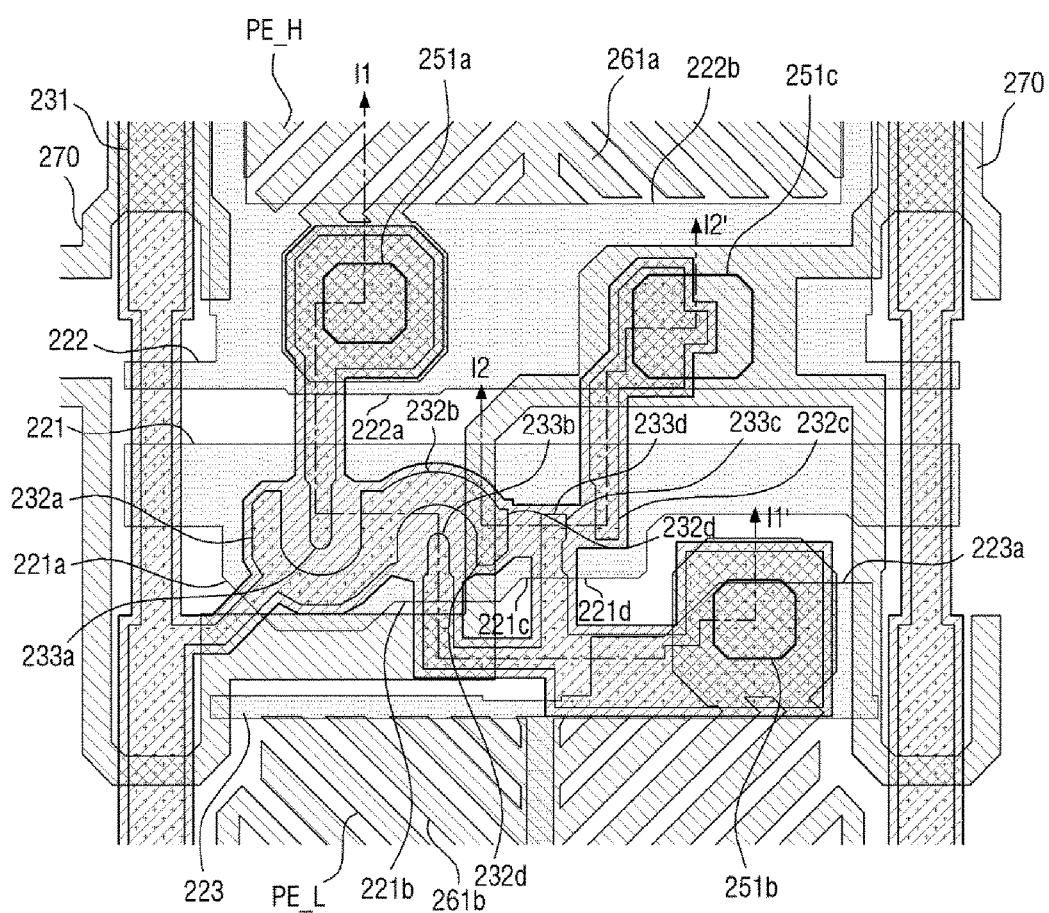

[FIG. 5]
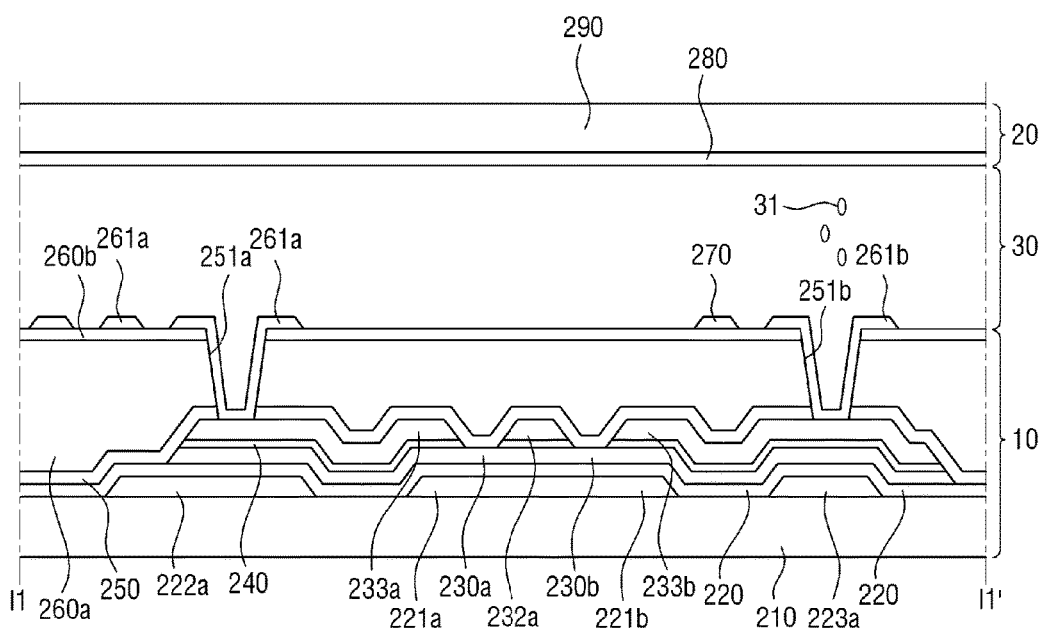

[FIG. 6]
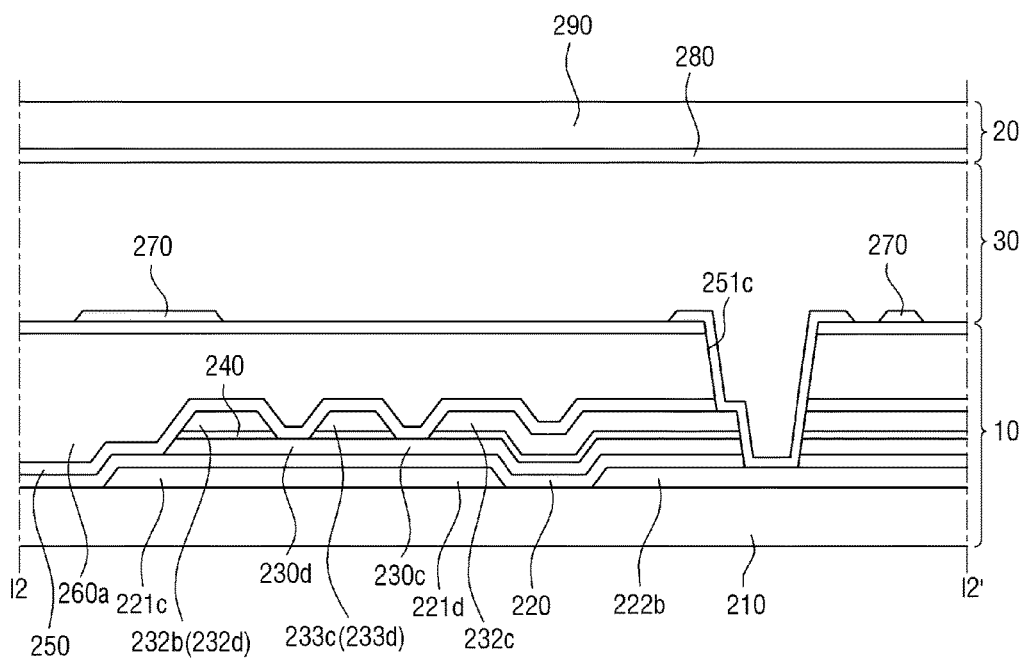

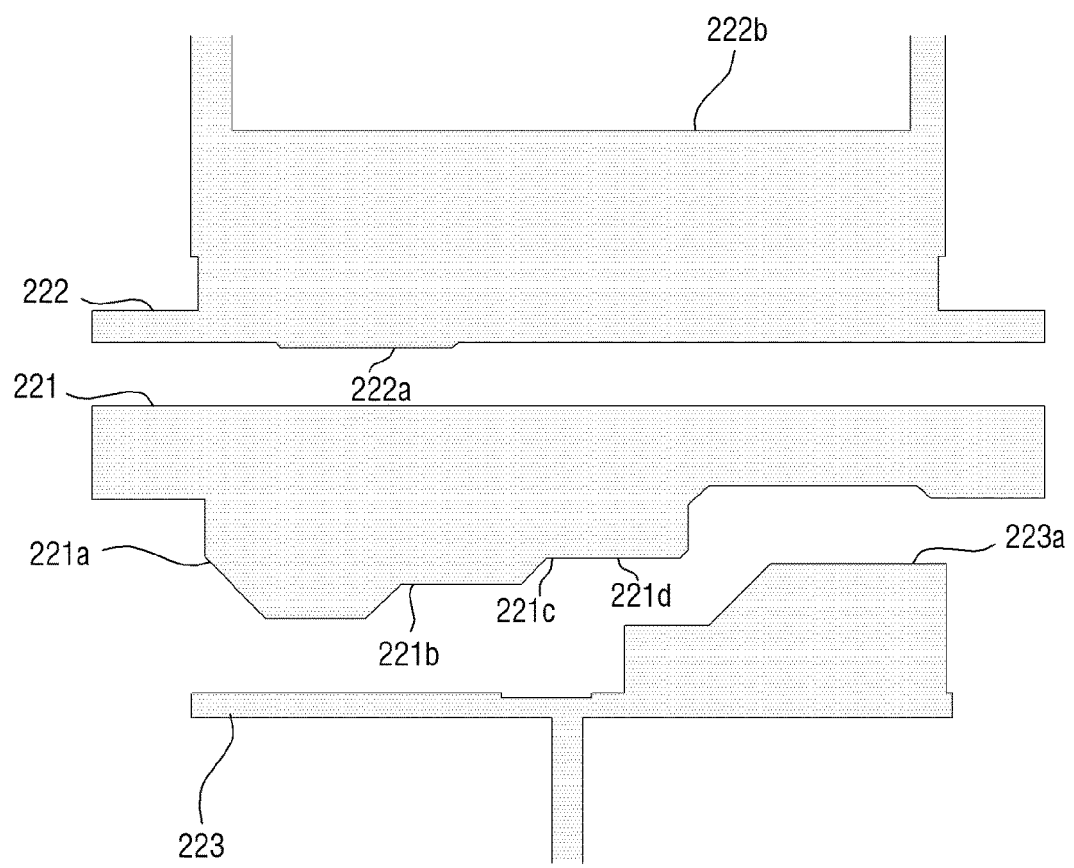
[FIG. 7]

[FIG. 8]
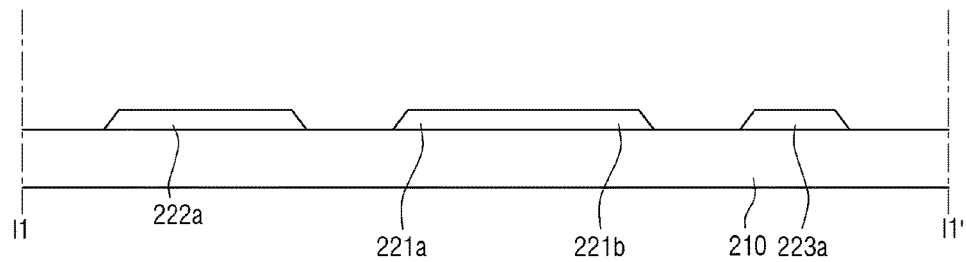
[FIG. 9]
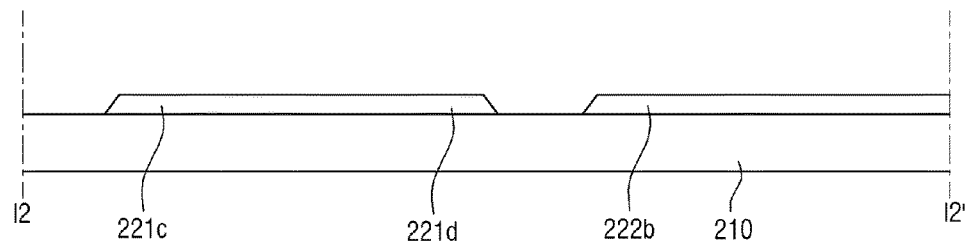

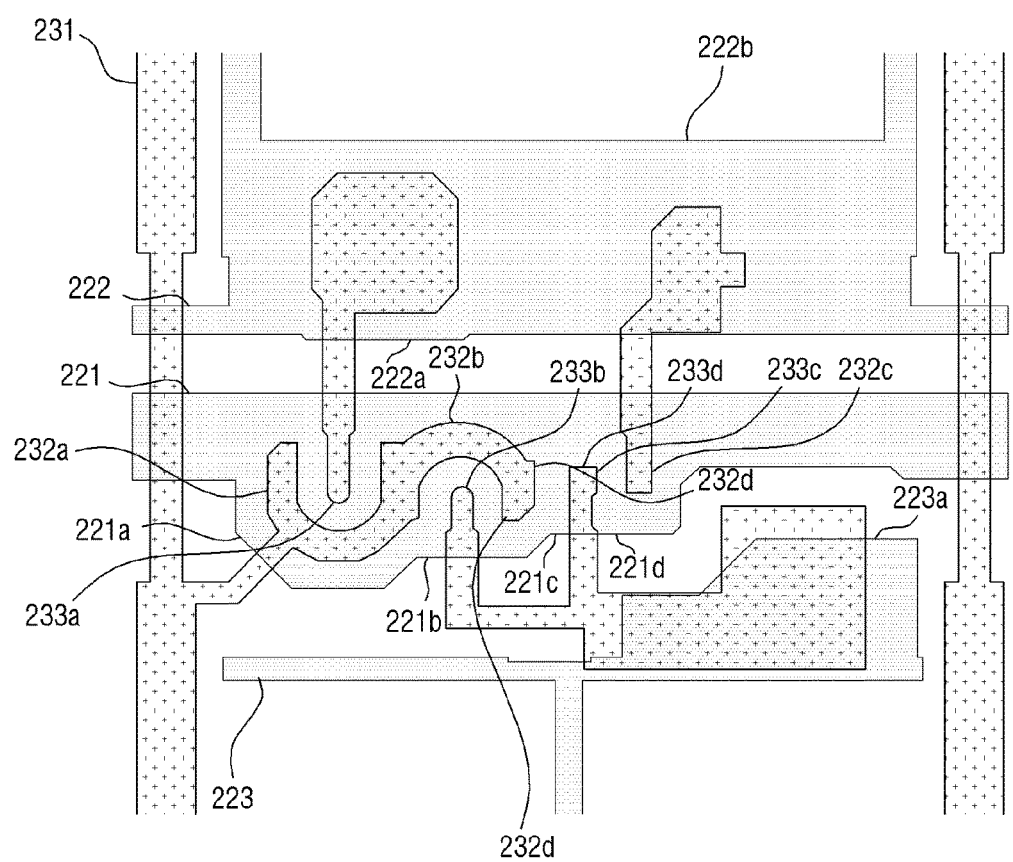
[FIG. 10]

[FIG. 11]
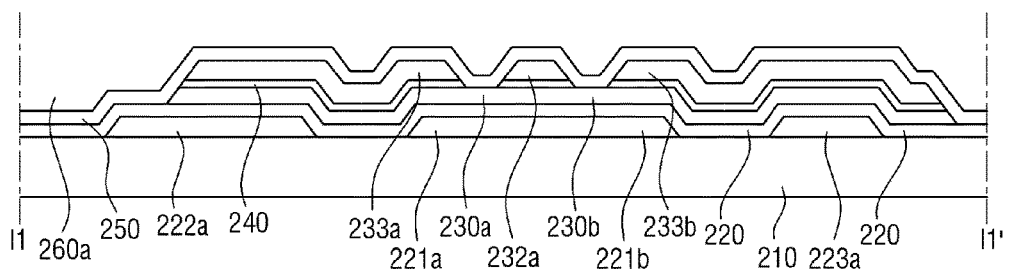
[FIG. 12]
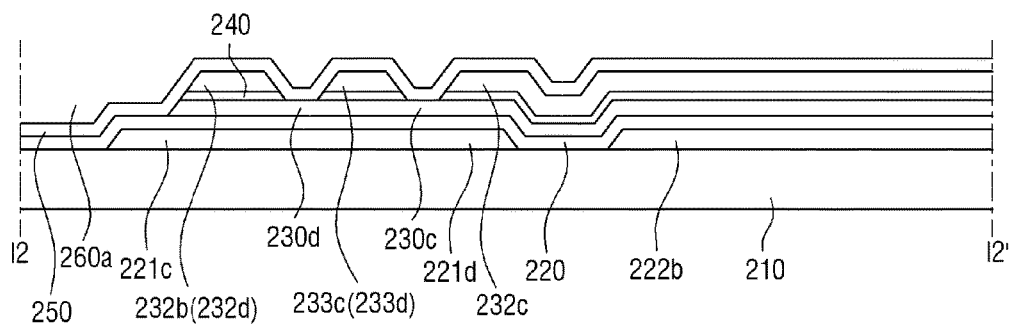

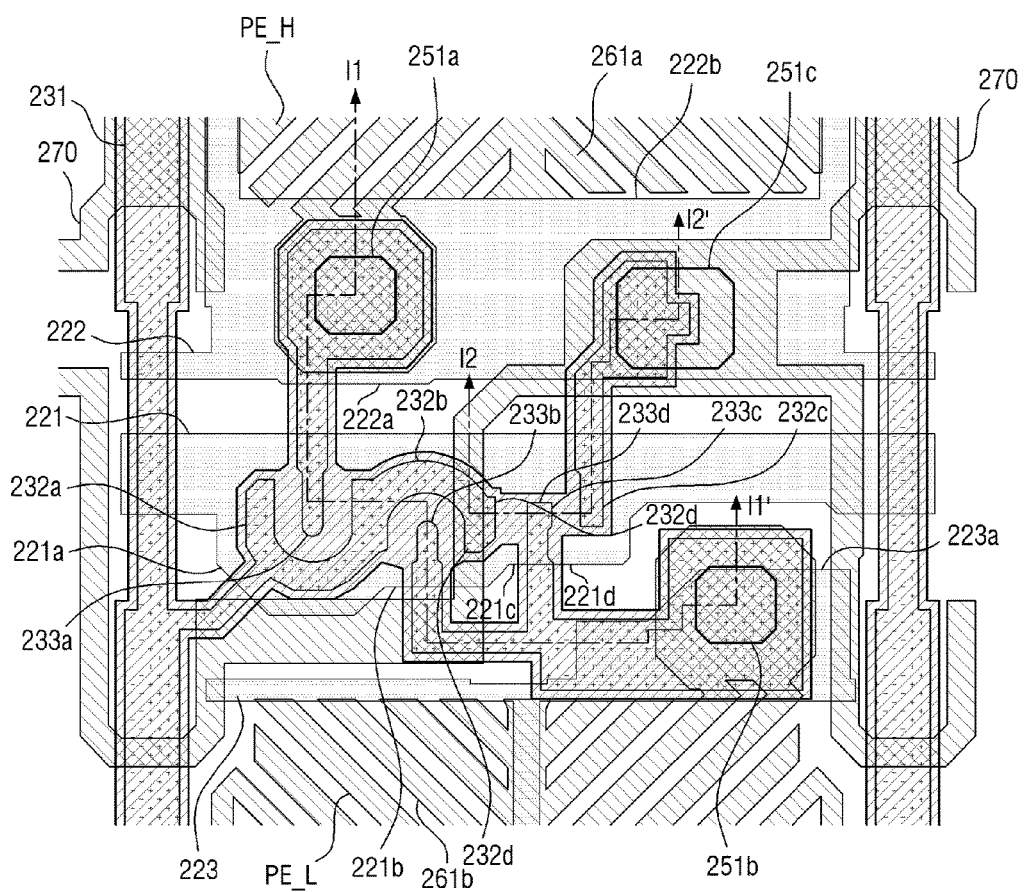
[FIG. 13]

【FIG. 14】
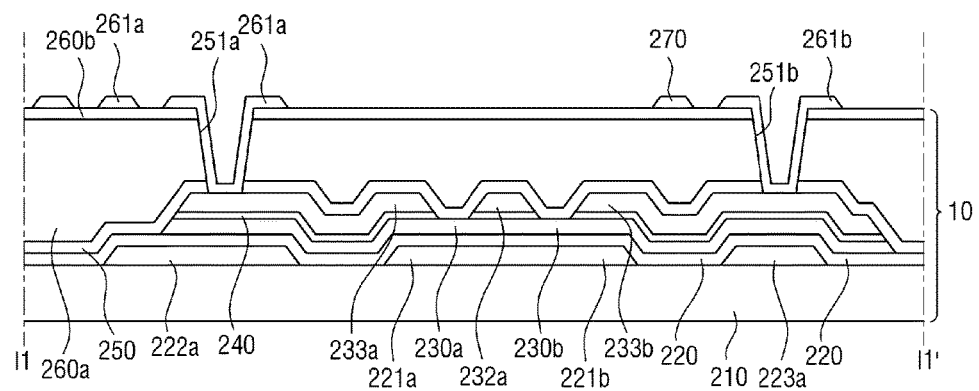
【FIG. 15】
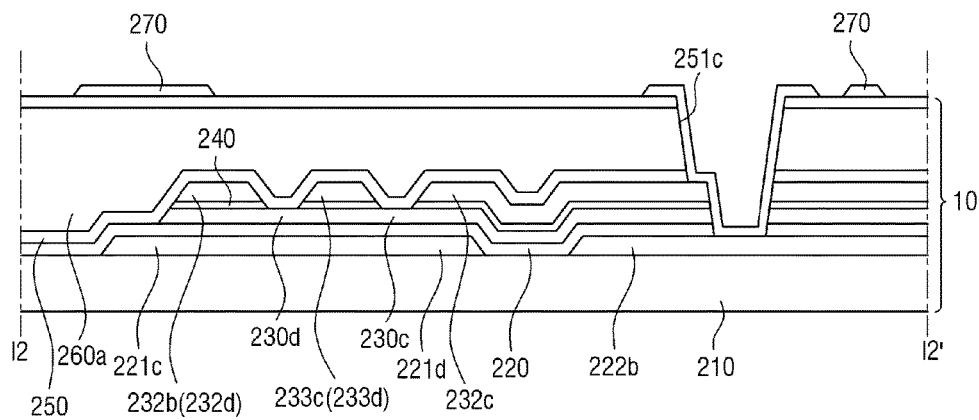

LIQUID CRYSTAL DISPLAY INCLUDING TRANSISTOR WITH IMPROVED CHARGING RATE

This application claims priority to Korean Patent Application No. 10-2015-0095315 filed on Jul. 3, 2015, and all the benefits accruing therefrom under 35 U.S.C. 119, the content of which in its entirety is herein incorporated by reference.

BACKGROUND

1. Field

The exemplary embodiments of the invention relate to a liquid crystal display ("LCD").

2. Description of the Related Art

With the development of multimedia, the importance of display devices is increasing. Accordingly, various types of display devices such as liquid crystal display ("LCD") and organic light-emitting display ("OLED") are being used.

In particular, the LCD is one of the most widely used types of flat panel displays. Generally, an LCD includes a pair of panels having field generating electrodes, such as pixel electrodes and a common electrode, and a liquid crystal layer interposed between the two panels. In an LCD, voltages are applied to field generating electrodes to generate an electric field in a liquid crystal layer. Accordingly, the alignment of liquid crystal molecules of the liquid crystal layer is determined, and polarization of incident light is controlled. As a result, a desired image is displayed on the LCD.

Of LCDs, vertically aligned ("VA") mode LCDs, in which long axes of liquid crystal molecules are aligned perpendicular to upper and lower display panels when no electric field is applied, are being developed. To secure improved lateral visibility, VA mode LCDs are being developed in various structures including a structure in which one pixel is divided into two subpixels.

SUMMARY

Exemplary embodiments of the invention provide a liquid crystal display ("LCD") in which one pixel area includes first and second liquid crystal capacitors charged with voltages of different magnitudes and an electric field of a different intensity is applied to liquid crystal molecules corresponding to each of the first and second liquid crystal capacitors to improve visibility.

Exemplary embodiments of the invention also provide an LCD having an improved charging rate.

However, exemplary embodiments of the invention are not restricted to the one set forth herein. The above and other exemplary embodiments of the invention will become more apparent to one of ordinary skill in the art to which the invention pertains by referencing the detailed description of the invention given below.

According to an exemplary embodiment of the invention, an LCD includes a display panel which has first and second subpixels, a gate driver which is connected to the first and second subpixels by an i-th gate line (where i is a natural number not smaller than 1) and a data driver which is connected to the first and second subpixels by a j-th data line (where j is a natural number not smaller than 1), where the first subpixel includes a first switching device having a first electrode connected to the j-th data line, a second electrode connected to a first subpixel electrode and a gate electrode connected to the i-th gate line, the second subpixel includes a second switching device having a first electrode connected to the j-th data line, a second electrode connected to a second subpixel electrode and a gate electrode connected to the i-th gate line, a third switching device having a first electrode connected to the second subpixel electrode and a gate electrode connected to the i-th gate line, and a fourth switching device having a first electrode connected to the j-th data line, a second electrode connected to the first electrode of the third switching device and a gate electrode connected to the i-th gate line, where i and j are natural numbers equal to or greater than one.

In an exemplary embodiment, a level of a voltage applied to the first subpixel electrode by a switching operation of the first switching device may be higher than that of a voltage applied to the second subpixel electrode by switching operations of the second through fourth switching devices.

In an exemplary embodiment, the first subpixel may further include a first storage capacitor having an end connected to the first subpixel electrode and the other end connected to a first storage line, and the second subpixel further includes a second storage capacitor having an end connected to the second subpixel electrode and the other end connected to the first storage line.

In an exemplary embodiment, a second electrode of the third switching device may be connected to a second storage line, and voltages provided from the first and second storage lines have different levels.

In an exemplary embodiment, the fourth switching device may further include a floating electrode which is disposed between the first and second electrodes of the fourth switching device, where the floating electrode overlaps at least part of the gate electrode of the fourth switching device.

In other exemplary embodiment of the invention, an LCD includes a gate line and a first storage line which are disposed on an array substrate, a data line which is disposed on the gate line and the first storage line and insulated from the gate line and the first storage line, a first switching device which has a first electrode connected to the data line and a second electrode connected to a first subpixel electrode, a second switching device which has a first electrode connected to the data line and a second electrode connected to a second subpixel electrode, a third switching device which has a first electrode connected to the second subpixel electrode and a second electrode connected to the first storage line and a fourth switching device which has a first electrode connected to the data line and a second electrode connected to the first electrode of the third switching device, where a gate electrode of each of the first through fourth switching devices is connected to the gate line.

In an exemplary embodiment, a level of a voltage applied to the first subpixel electrode by a switching operation of the first switching device may be higher than that of a voltage applied to the second subpixel electrode by switching operations of the second through fourth switching devices.

In an exemplary embodiment, the LCD may further include a second storage line which is disposed on the array substrate and on the same layer as the gate line, a first storage capacitor which is provided between the second storage line and the first subpixel electrode and a second storage capacitor which is provided between the second storage line and the second subpixel electrode.

In an exemplary embodiment, the gate line may intersect the data line, and the first storage line and the second storage line extend in the same direction as the gate line.

In an exemplary embodiment, voltages of equal levels may be applied to the first storage line and the second storage line.

In an exemplary embodiment, voltages of different levels may be applied to the first storage line and the second storage line.

In an exemplary embodiment, the LCD may further include first through fourth semiconductor layers which are disposed between the gate line and the data line, where at least part of the first semiconductor layer overlaps the gate electrode of the first switching device, at least part of the second semiconductor layer overlaps the gate electrode of the second switching device, at least part of the third semiconductor layer overlaps the gate electrode of the third switching device, and at least part of the fourth semiconductor layer overlaps the gate electrode of the fourth switching device.

In an exemplary embodiment, the LCD may further include a counter substrate which is located opposite the array substrate, a common electrode which is disposed on the counter substrate and a liquid crystal layer which is disposed between the array substrate and the counter substrate.

In an exemplary embodiment, the LCD may further include a blocking electrode which is disposed on the data line to overlap at least part of the data line.

In an exemplary embodiment, the fourth switching device may further include a floating electrode which is disposed between the first and second electrodes of the fourth switching device, where the floating electrode overlaps at least part of the gate electrode of the fourth switching device.

In other exemplary embodiment of the invention, an LCD including a gate driver which provides an i-th gate signal through an i-th gate line, a data driver which provides a j-th data signal through a j-th data line and a display panel which has first and second subpixels, each connected to the i-th gate line and the j-th data line, where the first subpixel includes a first switching device which transmits the j-th data signal to a first subpixel electrode in response to the i-th gate signal, and the second subpixel includes a second switching device which transmits the j-th data signal to a second subpixel electrode in response to the i-th gate signal, a third switching device which transmits a first storage signal received through a first storage line to the second subpixel electrode in response to the i-th gate signal and a fourth switching device which transmits the j-th data signal to the second subpixel in response to the i-th gate signal, where i and j are natural numbers equal to or greater than one.

In an exemplary embodiment, a level of a voltage applied to the first subpixel electrode by a switching operation of the first switching device may be higher than that of a voltage applied to the second subpixel electrode by switching operations of the second through fourth switching devices.

In an exemplary embodiment, the third switching device may include a gate electrode connected to the i-th gate line, a first electrode connected to the second subpixel electrode and a second electrode connected to the first storage line, and the fourth switching device may include a gate electrode connected to the i-th gate line, a first electrode connected to the j-th data line and a second electrode connected to the second subpixel electrode.

In an exemplary embodiment, the first subpixel further may include a first storage capacitor which has a first electrode connected to the first subpixel electrode and a second electrode connected to a second storage line, and the second subpixel may further include a second storage capacitor which has a first electrode connected to the second subpixel electrode and a second electrode connected to the second storage line, where a level of a voltage of the first storage signal is different from a level of a voltage of a second storage signal provided from the second storage line.

In an exemplary embodiment, the fourth switching device further may include a floating electrode which is disposed between the first and second electrodes of the fourth switching device, where the floating electrode overlaps at least part of the gate electrode of the fourth switching device.

BRIEF DESCRIPTION OF THE DRAWINGS

The above and other exemplary embodiments and features of the invention will become more apparent by describing in detail exemplary embodiments thereof with reference to the attached drawings, in which:

FIG. 1 is a block diagram of a liquid crystal display ("LCD") according to an exemplary embodiment of the invention;

FIG. 2 is a circuit diagram of one example pixel included in the LCD of FIG. 1

FIG. 3 is a diagram illustrating the operation of the pixel of FIG. 2;

FIG. 4 is a partial plan view of the pixel included in the LCD of FIG. 1;

FIG. 5 is a cross-sectional view taken along line I1-I1' of the plan view of FIG. 4;

FIG. 6 is a cross-sectional view taken along line I2-I2' of the plan view of FIG. 4; and FIGS. 7 through 15 are views illustrating a method of fabricating the pixel of FIG. 4.

DETAILED DESCRIPTION

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this invention will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be between the element and the another element. In contrast, when an element is referred to as being "directly on", "directly connected to" or "directly coupled to" another element or layer, there are no intervening elements or layers between the element and the another element. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region provided by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments of the invention will be described with reference to the accompanying drawings.

FIG. 1 is a block diagram of a liquid crystal display ("LCD") according to an exemplary embodiment of the invention.

Referring to FIG. 1, the LCD according to the illustrated exemplary embodiment may include a display panel 110, a data driver 120, a gate driver 130, and a timing controller 140.

The display panel 110 is a panel that displays images. The display panel 110 may include a lower display panel 10 (see FIG. 5), an upper display panel 20 (see FIG. 5) which faces the lower display panel 10, and a liquid crystal layer 30 (see FIG. 5) which is interposed between the lower display panel 10 and the upper display panel 20. That is, the display panel 110 may be a liquid crystal panel, for example. The display panel 110 may be connected to a plurality of gate lines SL1 through SLn and a plurality of data lines DL1 through DLm. In addition, the display panel 110 may include a plurality of pixels PX, each connected to one of the gate lines SL1 through SLn and one of the data lines DL1 through DLm. The gate lines SL1 through SLn, the data lines DL1 through DLm, and the pixels PX may be disposed on the lower display panel 10 (see FIG. 5) of the display panel 110. The gate lines SL1 through SLn and the data lines DL1 through DLm may be insulated from each other.

The pixels PX may be arranged in a matrix on the lower display panel 10 (see FIG. 5). In an exemplary embodiment, the data lines DL1 through DLm may be disposed on the lower display panel 10 to extend along a first direction d1, and the gate lines SL1 through SLn may be disposed on the lower display panel 10 to extend along the second direction d2 intersecting the first direction d1. In FIG. 1, the first direction d1 may be a column direction, and the second direction d2 may be a row direction. Each of the pixels PX may receive a data signal from one of the data lines DL1 through DLm in response to a gate signal from one of the gate lines SL1 through SLn. However, the invention is not limited thereto, and the pixels PX may not be arranged in a matrix.

In an exemplary embodiment, the data driver 120 may include a shift register, a latch, and a digital-to-analog converter ("DAC") according to an exemplary embodiment of the invention. The data driver 120 may receive a first control signal CONT1 and image data DATA from the timing controller 140. The data driver 120 may select a reference voltage corresponding to the first control signal CONT1 and convert the received image data DATA in a digital waveform into a plurality of data voltages D1 through Dm based on the selected reference voltage. The data driver 120 may provide the generated data signals D1 through Dm to the display panel 110.

The gate driver 130 may receive a second control signal CONT2 from the timing controller 140. In response to the second control signal CONT2, the gate driver 130 may provide a plurality of gate signals S1 through Sn to the display panel 110.

The timing controller 140 may receive an image signal R, G, B and a control signal CS from an external source. The control signal CS may include a vertical synchronization signal, a horizontal synchronization signal, a main clock signal, and a data enable signal according to an exemplary embodiment of the invention. The timing controller 140 may generate the image data DATA, the first control signal CONT1 and the second control signal CONT2 by processing the signals received from the external source according to the operating conditions of the display panel 110. The first control signal CONT1 may include a horizontal synchronization start signal for instructing to start inputting the image data DATA and a load signal for controlling the transmission of the data signals D1 through Dm to the data lines DL1 through DLm. The second control signal CONT2 may include a scan start signal for instructing to start outputting the gate signals S1 through Sn and a gate clock signal for controlling the output timing of a scan-on pulse.

The LCD according to the illustrated exemplary embodiment may further include a power supply unit (not illustrated). The power supply unit may provide a common voltage Vcom to the display panel 110 via a common line (not illustrated). The common line may be used to supply the common voltage Vcom provided by the power supply unit to a common electrode 280 (see FIG. 5) of the display panel 110. The common line may extend on a side of the display panel 110 along a direction. The common electrode 280 (see FIG. 5) may be unitary with the upper display panel 20 (see FIG. 5) according to an exemplary embodiment of the invention.

FIG. 2 is a circuit diagram of one example pixel PXij included in the LCD of FIG. 1. That is, the pixel PXij illustrated in FIG. 2 is one of the pixels PX which is connected to a jth data line DLj and an ith gate line SLi. The pixel PXij will now be described in detail with reference to FIG. 2.

The pixel PXij may include a first subpixel SPX1 and a second subpixel SPX2.

The first subpixel SPX1 may include a first switching device TR1, a first liquid crystal capacitor Clc_H, and a first storage capacitor Cst_H.

The first switching device TR1 may be a three-terminal device such as a thin-film transistor ("TFT") according to an exemplary embodiment of the invention. Hereinafter, a case where the first switching device TR1 is a TFT will be described as an example.

The first switching device TR1 may include a gate electrode connected to the ith gate line SLi, a first electrode connected to the jth data line DLj, and a second electrode connected to a first electrode of the first liquid crystal capacitor Clc_H, that is, a first subpixel electrode PE_H. The first electrode of the first switching device TR1 may be a source electrode according to an exemplary embodiment of the invention, and the second electrode of the first switching device TR1 may be a drain electrode according to an exemplary embodiment of the invention. The first switching device TR1 may perform a switching operation in response to an $i^{th}$ gate signal S1 received from the $i^{th}$ gate line SLi, thereby providing a $i^{th}$ data signal Dj received from the $j^{th}$ data line DLj to the first subpixel electrode PE_H.

The first liquid crystal capacitor Clc_H may be provided between the first subpixel electrode PE_H and the common electrode Vcom which faces the first subpixel electrode PE_H. The first storage capacitor Cst_H may be provided between the second electrode of the first switching device TR1 and a first storage line Vcst to which a first storage voltage is applied.

The second subpixel SPX2 may include a second switching device TR2, a second liquid crystal capacitor Clc_L, and a second storage capacitor Cst_L.

The second switching device TR2 may be a three-terminal device such as a TFT according to an exemplary embodiment of the invention. Hereinafter, a case where the second switching device TR2 is a TFT will be described as an example.

The second switching device TR2 may include a gate electrode connected to the ith gate line SLi, a first electrode connected to the jth data line DLj, and a second electrode connected to a first electrode of the second liquid crystal capacitor Clc_L, that is, a second subpixel electrode PE_L. The first electrode of the second switching device TR2 may be a source electrode according to an exemplary embodiment of the invention, and the second electrode of the second switching device TR2 may be a drain electrode according to an exemplary embodiment of the invention. The second switching device TR2 may perform a switching operation in response to the ith gate signal S1 received from the ith gate line SLi, thereby providing the jth data signal Dj received from the jth data line DLj to the second subpixel electrode PE_L.

The second liquid crystal capacitor Clc_L may be provided between the second subpixel electrode PE_L and the common electrode Vcom which faces the second subpixel electrode PE_L. The second storage capacitor Cst_L may be provided between the second electrode of the second switching device TR2 and the first storage line Vcst to which the first storage voltage is applied.

The second subpixel SPX2 may further include third and fourth switching devices TR3 and TR4. Each of the third and fourth switching devices TR3 and TR4 may be a three-terminal device such as a TFT according to an exemplary embodiment of the invention. Hereinafter, a case where each of the third and fourth switching devices TR3 and TR4 is a TFT will be described as an example.

The third switching device TR3 may have a gate electrode connected to the ith gate line SLi, a first electrode connected to the second subpixel electrode PE_L, and a second electrode connected to a second storage line Vrd. Here, the level of a voltage applied through the second storage line Vrd may be equal to or different from that of a voltage applied through the first storage line Vcst. The third switching device TR3 may perform a switching operation in response to the ith gate signal S1 received through the ith gate line SLi, thereby providing a second storage voltage received through the second storage line Vrd to the second subpixel electrode PE_L. The fourth switching device TR4 may have a gate electrode connected to the ith gate line SLi, a first electrode connected to the jth data line DLj, and a second electrode connected to the first electrode of the third switching device TR3. The fourth switching device TR4 may perform a switching operation in response to the ith gate signal S1 received through the ith gate line SLi, thereby providing the jth data signal Dj received through the jth data line DLj to the first electrode of the third switching device TR3.

At least one of the first through fourth switching devices TR1 through TR4 may be a field relaxation transistor according to an exemplary embodiment of the invention. That is, although not illustrated in the drawing, at least one of the first through fourth switching devices TR1 through TR4 may include a floating electrode which is disposed between a source electrode and a drain electrode and overlaps at least part of a gate electrode.

FIG. 3 is a diagram illustrating the operation of the pixel PXij of FIG. 2.

Referring to FIGS. 2 and 3, the first through fourth switching devices TR1 through TR4 may be turned on when a gate-on signal is transmitted to the ith gate line SLi. In the case of the first subpixel SPX1, the jth data signal Dj transmitted to the jth data line DLj may be provided to the first subpixel electrode PE_H via the turned-on first switching device TR1. Accordingly, the first liquid crystal capacitor Clc_H may be charged with a difference between the common voltage Vcom and a voltage of the $j^{th}$ data signal Dj. In addition, the first storage capacitor Cst_H may be charged with a difference between the first storage voltage Vcst and the voltage of the $j^{th}$ data signal Dj.

In the case of the second subpixel SPX2, the $i^{th}$ data signal Dj transmitted to the $i^{th}$ data line DLj may be provided to the second subpixel electrode PE_L via the turned-on second switching device TR2. In addition, the $j^{th}$ data signal Dj transmitted to the $j^{th}$ data line DLj may be provided to the first electrode of the third switching device TR3, that is, the second subpixel electrode PE_L via the turned-on fourth switching device TR4. That is, the second liquid crystal capacitor Clc_1 may be charged with a difference between the common voltage Vcom and the voltage of the $j^{th}$ data signal Dj. At this time, the voltage charged in the second liquid crystal capacitor Clc_L may be divided by the turned-on third switching device TR3. Accordingly, the level of the voltage charged in the second liquid crystal capacitor Clc_L may be lower than that of the voltage charged in the first liquid crystal capacitor Clc_H.

A case where the fourth switching device TR4 is not available will hereinafter be described. In this case, the voltage of the $j^{th}$ data signal Dj may be Va, and a voltage applied to the second electrode of the second switching device TR2 and then charged in the second liquid crystal capacitor Clc_L may be Vb.

The magnitude of a current I2 flowing through the second switching device TR2 is proportional to a channel width W2 of the second switching device TR2 and inversely proportional to a channel length L2. Here, since a resistance value R2 is inversely proportional to a current value, Equation (1) below may be satisfied:

$$I2 \propto \frac{W2}{L2} \quad R2 \propto \frac{L2}{W2}. \tag{1}$$

Similarly, the magnitude of a current I3 flowing through the third switching device TR3 is proportional to a channel width W3 of the third switching device TR3 and inversely proportional to a channel length L3. Here, since a resistance value R3 is inversely proportional to a current value, Equation (2) below may be satisfied:

$$I3 \propto \frac{W3}{L3} \quad R3 \propto \frac{L3}{W3}. \tag{2}$$

Assuming that a difference between the voltage Va of the jth data signal Dj and a divided reference voltage is a divided voltage $\Delta V$, a step-down voltage $\Delta VA$ reduced by the switching operation of the second switching device TR2 may satisfy Equation (3) below:

$$\Delta VA = \frac{R2}{R2+R3}\Delta V \propto \frac{\frac{L2}{W2}}{\frac{L2}{W2}+\frac{L3}{W3}} \Delta V \approx \frac{W3}{W2+W3}\Delta V \tag{3}$$

$$\Delta VA = \frac{W3}{W2+W3}\Delta V.$$

The magnitude of the voltage Vb applied to the second electrode of the second switching device TR2 and then charged in the second liquid crystal capacitor Clc_L may be a value obtained by subtracting the step-down voltage $\Delta VA$ from the voltage Va of the jth data signal Dj. Therefore, Vb=Va−$\Delta VA$. Ultimately, Equation (4) below may be satisfied:

$$\frac{Vb}{Va} \approx 1 - \frac{W3}{W2+W3}\frac{\Delta V}{Va} \approx \frac{W2}{W2+W3}\frac{\Delta V}{Va}. \tag{4}$$

Therefore, the voltage Vb charged in the second liquid crystal capacitor Clc_L by the switching operation of the second switching device TR2 may satisfy Equation (5) below:

$$Vb \approx \frac{W2}{W2+W3}\Delta V. \tag{5}$$

Referring to Equation (5), since the voltage Vb charged in the second liquid crystal capacitor Clc_L is lower than the step-down voltage $\Delta V$ (the difference between the voltage Va of the $j^{th}$ data signal Dj and the divided reference voltage), it becomes lower than the voltage Va charged in the first liquid crystal capacitor Clc_H of the first subpixel SPX1 through the $j^{th}$ data line DLj. That is, since one pixel area includes the first and second liquid crystal capacitors Clc_H and Clc_L charged with voltages of different magnitudes, the intensity of an electric field applied to liquid crystal molecules corresponding to each of the first and second liquid crystal capacitors Clc_H and Clc_L may be different. Accordingly, this may cause the liquid crystal molecules to tilt at different angles in regions corresponding to the first and second liquid crystal capacitors Clc_H and Clc_L. As a result, the regions corresponding to the first and second liquid crystal capacitors Clc_H and Clc_L may have different luminance levels.

When turned on, the second switching device TR2 needs to accurately deliver a voltage applied to the $j^{th}$ data line DLj for a predetermined 1H period to the second liquid crystal capacitor Clc_L. That is, the second switching device TR2 needs to have a high charging rate which is more important in a display device having a large screen size of about 55 inches or more, for example. However, when a width of the second switching device TR2 is increased in order to increase the charging rate of the second switching device TR2, a kickback voltage Vkb_L may increase.

When a gate signal falls from a high voltage to a low voltage, a voltage applied to a pixel electrode may be affected by the transition of the gate signal. Accordingly, the voltage applied to the pixel electrode may be changed in the direction of the transition. In this case, the amount of change in the voltage applied to the pixel electrode may be referred to as a kickback voltage. The kickback voltage may be a bigger problem in the second subpixel SPX2 including a relatively large number of switching devices.

In this regard, the LCD according to the illustrated exemplary embodiment may further include the fourth switching device TR4 having the gate electrode connected to the $i^{th}$ gate line SLi, the first electrode connected to the $j^{th}$ data line DLj, and the second electrode connected to the first electrode of the third switching device TR3 which is electrically connected to the second subpixel electrode PE_L. That is, the fourth switching device TR4 may be connected in parallel to the second switching device TR2 and reduce the resistance value of the second switching device TR2. Accordingly, the magnitude of the current I2 flowing through the second switching device TR2 may be increased, thereby bringing about the same effect as the effect obtained when the channel width W2 of the second switching device TR2 is increased.

Therefore, in the LCD according to the illustrated exemplary embodiment, the charging rate of the second switching device TR2 may be improved, while the kickback voltage of the second subpixel electrode PE_L is reduced as shown in Table 1 below.

TABLE 1

|  | Conventional Art | Exemplary embodiment |
| --- | --- | --- |
| White | 1.81 | 1.67 |
| Green | 2.67 | 2.47 |
| Blue | 2.72 | 2.52 |

Table 1 compares the LCD having a screen size of about 55 inches or more according to the exemplary embodiment with a conventional LCD in terms of the kickback voltage of the second subpixel electrode PE_L for each color.

Referring to Table 1, the kickback voltage of the LCD according to the exemplary embodiment was reduced by approximately 0.14 volt (V) compared to the conventional LCD in the case of white and by approximately 0.20 V in the case of green and blue.

FIG. 4 is a partial plan view of the pixel PXij included in the LCD of FIG. 1. FIG. 5 is a cross-sectional view taken along line I1-I1' of the plan view of FIG. 4. FIG. 6 is a cross-sectional view taken along line I2-I2' of the plan view of FIG. 4. FIGS. 7 through 15 are views illustrating a method of fabricating the pixel PXij of FIG. 4.

Referring to FIGS. 4 through 6, the LCD according to the illustrated exemplary embodiment may include the lower display panel 10, the upper display panel 20, and the liquid crystal layer 30. The lower display panel 10 may be placed to face the upper display panel 20, and the liquid crystal layer 30 may be interposed between the lower display panel 10 and the upper display panel 20. In an exemplary embodiment, the lower display panel 10 and the upper display panel 20 may be bonded together by sealing, for example.

First, the lower display panel 10 will be described below.

A lower substrate 210 may be a glass substrate, a plastic substrate, or a low-temperature polysilicon ("LTPS") substrate according to an exemplary embodiment of the invention. The lower substrate 210 may also be an array substrate including a plurality of switching devices. A gate line 221, a first storage line 222, and a second storage line 223 may be disposed on the lower substrate 210.

Referring to FIGS. 7 through 9, the gate line 221 may include a first gate electrode 221a, a second gate electrode 221b, a third gate electrode 221c, a fourth gate electrode 221d, and a gate pad (not illustrated). The gate pad may be connected to another layer or an external driver circuit. The first storage line 222 may include a plurality of first storage electrodes 222a and 222b, and the second storage line 223 may include at least one second storage electrode 223a. The first storage line 222 may be disposed on the same layer as the second storage line 223. Thus, the same voltage may be applied to the first storage line 222 and the second storage line 223. In an alternative exemplary embodiment, although not illustrated in the drawings, the first storage line 222 and the second storage line 223 may be insulated from each other and provided with different voltages.

A gate insulating layer 220 may be disposed on the gate line 221 and the first and second storage lines 222 and 223. In an exemplary embodiment, the gate insulating layer 220 may include silicon nitride (SiNx) or silicon oxide (SiOx), for example, according to an exemplary embodiment of the invention. In an exemplary embodiment, the gate insulating layer 220 may have a multilayer structure including two insulating layers with different physical characteristics.

First through fourth semiconductor layers 230a through 230d may be disposed on the gate insulating layer 220. In an exemplary embodiment, each of the first through fourth semiconductor layers 230a through 230d may include, but not limited to, amorphous silicon or crystalline silicon.

An ohmic contact layer 240 may be disposed on the first through fourth semiconductor layers 230a through 230d. In an exemplary embodiment, the ohmic contact layer 240 may include a material such as n+ hydrogenated amorphous silicon heavily doped with an n-type impurity such as phosphorous or may include silicide.

Referring to FIGS. 10 through 12, a pair of a first source electrode 233a and a first drain electrode 232a that provides the first switching device TR1 may be disposed on the ohmic contact layer 240 to overlap at least part of the first semiconductor layer 230a. The first source electrode 233a may be located on the first gate electrode 221a such that a side of the first source electrode 233a overlaps at least part of the first gate electrode 221a and that the other side of the first source electrode 233a is connected to a first subpixel electrode 261a or PE_H by a first contact hole 251a. In an exemplary embodiment, the first source electrode 233a may include a refractory metal such as molybdenum, chrome, tantalum or titanium, or an alloy of these metals. In an exemplary embodiment, the first source electrode 233a may have a multilayer structure including a refractory metal layer and a conductive layer having low resistivity. However, the invention is not limited thereto, and the first source electrode 233a may include various metals or conductors.

The first drain electrode 232a may extend from a data line 231 and surround at least part of the first source electrode 233a. In an exemplary embodiment, the first drain electrode 232a may have one of C, U, reverse C, and reverse U shapes, for example. In addition, the first drain electrode 232a may have the same material and structure as those of the first source electrode 233a, for example. That is, the first source electrode 233a and the first drain electrode 232a may be provided simultaneously by the same process. Further, the first source electrode 233a, the first drain electrode 232a, and the data line 231 may be disposed on the same layer.

The first gate electrode 221a, the first source electrode 233a, and the first drain electrode 232a may provide the first switching device TR1 together with the first semiconductor layer 230a. That is, a channel of the first switching device TR1 may be provided in a semiconductor portion between the first source electrode 233a and the first drain electrode 232a.

A pair of a second source electrode 233b and a second drain electrode 232b that provide the second switching device TR2 may be disposed on the ohmic contact layer 240 to overlap at least part of the second semiconductor layer 230b. The second source electrode 233b may be located on the second gate electrode 221b such that a side of the second source electrode 233b overlaps at least part of the second gate electrode 221b and that the other side of the second source electrode 233b is connected to a second subpixel electrode 261b or PE_L by a second contact hole 251b. The second source electrode 233b may include a refractory metal such as molybdenum, chrome, tantalum or titanium, or an alloy of these metals. In addition, the second source electrode 233b may have a multilayer structure including a refractory metal layer and a conductive layer having low resistivity. However, the invention is not limited thereto, and the second source electrode 233b may include various metals or conductors.

The second drain electrode 232b may extend from the first drain electrode 232a and surround at least part of the second source electrode 233b. In an exemplary embodiment, the second drain electrode 232b may have one of C, U, reverse C, and reverse U shapes. In addition, the second drain electrode 232b may have the same material and structure as the second source electrode 233b, for example.

The second gate electrode 221b, the second source electrode 233b, and the second drain electrode 232b may provide the second switching device TR2 together with the second semiconductor layer 230b. That is, a channel of the second switching device TR2 may be provided in a semiconductor portion between the second source electrode 233b and the second drain electrode 232b.

A pair of a third source electrode 233c and a third drain electrode 232c that provide the third switching device TR3 may be disposed on the ohmic contact layer 240 to overlap at least part of the third semiconductor layer 230c. Each of the third source electrode 233c and the third drain electrode 232c may have an 'I' shape according to an exemplary embodiment of the invention. The third gate electrode 221c, the third source electrode 233c, and the third drain electrode 232c may provide the third switching device TR3 together with the third semiconductor layer 230c. That is, a channel of the third switching device TR3 may be provided in a semiconductor portion between the third source electrode 233c and the third drain electrode 232c.

A pair of a fourth source electrode 233d and a fourth drain electrode 232d that provide the fourth switching device TR4 may be disposed on the ohmic contact layer 240 to overlap at least part of the fourth semiconductor layer 230d. Each of the fourth source electrode 233d and the fourth drain electrode 232d may have an 'I' shape according to an exemplary embodiment of the invention. The fourth gate electrode 221d, the fourth source electrode 233d, and the fourth drain electrode 232d may provide the fourth switching device TR4 together with the fourth semiconductor layer 230d. That is, a channel of the fourth switching device TR4 may be provided in a semiconductor portion between the fourth source electrode 233d and the fourth drain electrode 232d.

As described above with reference to FIG. 2, at least one of the first through fourth switching devices TR1 through TR4 may be a field relaxation transistor according to an exemplary embodiment of the invention. That is, although not illustrated in the drawings, at least one of the first through fourth switching devices TR1 through TR4 may further include a floating electrode which is disposed between a source electrode and a drain electrode and overlaps at least part of a gate electrode.

Referring to FIGS. 13 through 15, a first passivation layer 250 may be disposed on the first through fourth source electrodes 233a through 233d, the first through fourth drain electrodes 232a through 232d, and exposed portions of the first through fourth semiconductor layers 230a through 230d. In an exemplary embodiment, the first passivation layer 250 may include an inorganic or organic insulating material such as silicon nitride or silicon oxide. The first passivation layer 250 may prevent a pigment of a color filter 260a from penetrating into the exposed portions of the first through fourth semiconductor layers 230a through 230d.

The color filter 260a may display one of three primary colors, i.e., red, green and blue, but the invention is not limited thereto. The color filter 260a in each pixel may include a material of a different color from the color of a material that provides the color filter 260a in an adjacent pixel.

A second passivation layer 260b may be disposed on the color filter 260a. In an exemplary embodiment, the second passivation layer 260b may include an inorganic or organic insulating material such as silicon nitride or silicon oxide. The second passivation layer 260b may prevent the lifting of the color filter 260a and suppress the contamination of the liquid crystal layer 30 by organic matter such as a solvent introduced from the color filter 260a, thereby preventing a defect such as an afterimage created during screen driving.

The first through third contact holes 251a through 251c may be defined in the second passivation layer 260b. In addition, the first subpixel electrode 261a or PE_H and the second subpixel electrode 261b or PE_L may be disposed on the second passivation layer 260b. The first subpixel electrode 261a or PE_H and the second subpixel electrode 261b or PE_L may be separated from each other by the gate line 221 interposed therebetween. In an exemplary embodiment, each of the first subpixel electrode 261a or PE_H and the second subpixel electrode 261b or PE_L may include a transparent conductive material such as indium tin oxide ("ITO") or indium zinc oxide ("IZO") or a reflective metal such as aluminum, silver, chrome or an alloy thereof. In an exemplary embodiment, each of the first subpixel electrode 261a or PE_H and the second subpixel electrode 261b or PE_L may be shaped like a quadrilateral, for example. In an exemplary embodiment, each of the first subpixel electrode 261a or PE_H and the second subpixel electrode 261b or PE_L may include a cross-shaped stem part including a horizontal stem part and a vertical stem part intersecting the horizontal stem part. In addition, each of the first subpixel electrode 261a or PE_H and the second subpixel electrode 261b or PE_L may be divided into a plurality of domains by the first horizontal stem part and the vertical stem part, and a plurality of micro-branches may be provided in each of the domains.

The first subpixel electrode 261a or PE_H may be connected to the first source electrode 233a by the first contact hole 251a. Accordingly, the first subpixel electrode 261a or PE_H may receive a data voltage from the data line 231 through the switching operation of the first switching device TR1. The second subpixel electrode 261b or PE_L may receive the second storage voltage through the second storage electrode 223a exposed by the second contact hole 251b. In addition, the second subpixel electrode 261b or PE_L may receive a data voltage through the second source electrode 233b electrically connected to the second storage electrode 223a. Ultimately, a data voltage received through the data line 231 may be divided, and a portion of the data voltage may be applied to the second subpixel electrode 261b or PE_L.

Accordingly, the voltage applied to the first subpixel electrode 261a or PE_H is higher than the voltage applied to the second subpixel electrode 261b or PE_L. The first and second subpixel electrodes 261a or PE_H and 261b or PE_L provided with voltages of different magnitudes may generate an electric field together with the common electrode 280 on an upper substrate 290. The generated electric field may determine the direction of liquid crystal molecules 31 in the liquid crystal layer 30, and the luminance of light passing through the liquid crystal layer 30 may vary according to the direction of the liquid crystal molecules 31.

As illustrated in FIG. 4, the LCD according to the illustrated exemplary embodiment may include a blocking electrode 270 which is disposed on the data line 231 to overlap the data line 231. The blocking electrode 270 may prevent the leakage of light in an area around the data line 231. In an exemplary embodiment, the blocking electrode 270 may be a light-blocking member. The blocking electrode 270 may be electrically connected to the first storage line 222 by the third contact hole 251*c*. However, the invention is not limited thereto, and the blocking electrode 270 may also be a floating electrode.

The upper display panel 20 will now be described.

In an exemplary embodiment, the upper substrate 290 may include transparent glass or plastic, for example. The common electrode 280 may be disposed on the upper substrate 290. The common electrode 280 may generate an electric field with each of the first and second subpixel electrodes 261*a* or PE_H and 261*b* or PE_L, thereby determining the arrangement direction of the liquid crystal molecules 31 of the liquid crystal layer 30.

In the LCD according to the illustrated exemplary embodiment, voltages of different magnitudes are applied to the first and second subpixel electrodes 261*a* or PE_H and 261*b* or PE_L. Therefore, the intensity of an electric field applied to liquid crystal molecules corresponding to each of the first and second subpixel electrodes 261*a* or PE_H and 261*b* or PE_L may be different. Accordingly, this may cause the liquid crystal molecules to tilt at different angles in regions corresponding to the first and second subpixel electrodes 261*a* or PE_H and 261*b* or PE_L. As a result, the regions corresponding to the first and second subpixel electrodes 261*a* or PE_H and 261*b* or PE_L may have different luminance levels. When one pixel area is divided into regions having different luminance levels as described above, a change in transmittance according to a gray level may be controlled to be gentle, thereby improving visibility.

Further, in the LCD according to the illustrated exemplary embodiment, the effect obtained by increasing the channel width W2 of the second switching device TR2 may be obtained by electrically connecting the fourth switching device TR4 to the second switching device TR2 without increasing the channel width W2 of the second switching device TR2. Accordingly, the charging rate of the second switching device TR2 may be improved.

Embodiments of the invention provide at least one of the following advantages.

That is, visibility and charging rate may be improved.

However, the effects of the invention are not restricted to the one set forth herein. The above and other effects of the invention will become more apparent to one of daily skill in the art to which the invention pertains by referencing the claims.

What is claimed is:

1. A liquid crystal display comprising:
a display panel which includes first and second subpixels;
a gate driver which is connected to the first and second subpixels by an i-th gate line, where i is a natural number; and
a data driver which is connected to the first and second subpixels by a j-th data line, where j is a natural number,
wherein
the first subpixel comprises a first switching device including a first electrode connected to the j-th data line, a second electrode connected to a first subpixel electrode and a gate electrode connected to the i-th gate line,
the second subpixel comprises a second switching device including a first electrode connected to the j-th data line, a second electrode connected to a second subpixel electrode and a gate electrode connected to the i-th gate line, a third switching device including a first electrode connected to the second subpixel electrode and a gate electrode connected to the i-th gate line, and a fourth switching device including a first electrode connected to the j-th data line, a second electrode directly connected to the first electrode of the third switching device and a gate electrode connected to the i-th gate line, wherein i and j are natural numbers equal to or greater than one.

2. The liquid crystal display of claim 1, wherein a level of a voltage applied to the first subpixel electrode by a switching operation of the first switching device is higher than that of a voltage applied to the second subpixel electrode by switching operations of the second through fourth switching devices.

3. The liquid crystal display of claim 1, wherein the first subpixel further comprises a first storage capacitor including an end connected to the first subpixel electrode and the other end connected to a first storage line, and the second subpixel further comprises a second storage capacitor including an end connected to the second subpixel electrode and the other end connected to the first storage line.

4. The liquid crystal display of claim 3, wherein a second electrode of the third switching device is connected to a second storage line, and voltages provided from the first and second storage lines have different levels.

5. The liquid crystal display of claim 1, wherein the fourth switching device further comprises a floating electrode which is disposed between the first and second electrodes of the fourth switching device, wherein the floating electrode overlaps at least part of the gate electrode of the fourth switching device.

* * * * *